United States Patent [19]
Reutter et al.

[11] Patent Number: 5,008,524
[45] Date of Patent: Apr. 16, 1991

[54] OPTICAL RECEIVER WITH EXTENDED DYNAMIC RANGE

[75] Inventors: Jörg Reutter; Frank Krause, both of Stuttgart, Fed. Rep. of Germany

[73] Assignee: Alcatel N.V., Amsterdam, Netherlands

[21] Appl. No.: 408,626

[22] Filed: Sep. 18, 1989

[30] Foreign Application Priority Data

Sep. 28, 1988 [DE] Fed. Rep. of Germany ....... 3832857

[51] Int. Cl.$^5$ .............................................. H04B 9/00
[52] U.S. Cl. .................................. 250/214 A; 330/59; 455/619
[58] Field of Search ......................... 250/214 R, 214 A; 330/59, 308; 455/617, 619; 307/311

[56] References Cited

U.S. PATENT DOCUMENTS

| | | | |
|---|---|---|---|
| 4,498,001 | 2/1985 | Smoot | 250/214 A |
| 4,914,402 | 4/1990 | Dermitzakis et al. | 330/308 |

FOREIGN PATENT DOCUMENTS

3633984A1 4/1988 Fed. Rep. of Germany .

OTHER PUBLICATIONS

U. Tietze and Ch. Schenk, *Halbleiter-Schaltungstechnik*, 8th rev ed., Springer-Verlag, 1986, p. 24.

*Primary Examiner*—David C. Nelms
*Assistant Examiner*—G. Beck
*Attorney, Agent, or Firm*—Peter C. Van Der Sluys

[57] ABSTRACT

To extend the dynamic range of an optical receiver with a transimpedance amplifier (TIV), it is known to operate the photodiode (PD) as an AC source at high light levels by using a DC-limiting element in the DC circuit of the photodiode, and to convert, by means of an AC circuit, the alternating voltage into an alternating current serving as the input current for the transimpedance amplifier (TIV), which lies within the permissible range. According to the invention, the AC circuit ($C_S$, $R_S$) runs from the photodiode terminal (2) not connected to the transimpedance amplifier input to the output ($U_a$) of the transimpedance amplifier, whereby an extension of the dynamic range is achieved. The current-limiting element is preferably a transistor circuit ($R_E$, T) connected as a constant-current source.

20 Claims, 2 Drawing Sheets

OPTICAL RECEIVER WITH EXTENDED DYNAMIC RANGE

The present invention relates to an optical receiver comprising a photodiode and a transimpedance amplifier, with the photodiode contained in a direct-current circuit between a supply-voltage source and the input of the transimpedance amplifier, and further comprising an element limiting the direct-current in the direct-current circuit and an alternating-current circuit fed from the photodiode, which acts as an alternating-current voltage source, and containing an impedance which converts alternating voltage of the photodiode into an alternating current flow into the transimpedance amplifier. Such an optical receiver is disclosed in DE-OS 36 33 984. In this prior-art optical receiver, the AC circuit, which serves to convert the alternating voltage developed across the photodiode in the event of a great reduction of direct current into an alternating current flowing into the transimpedance amplifier, runs from the photodiode to ground via parts of the DC circuit of the photodiode.

It is the object of the invention to provide an improved optical receiver based on this prior-art optical receiver.

This object is attained as set forth in claim 1. Further advantageous aspects of the invention are claimed in the subclaims. The invention will now be explained in more detail, by way of example, with reference to the accompanying drawings, in which:

Figure 1:
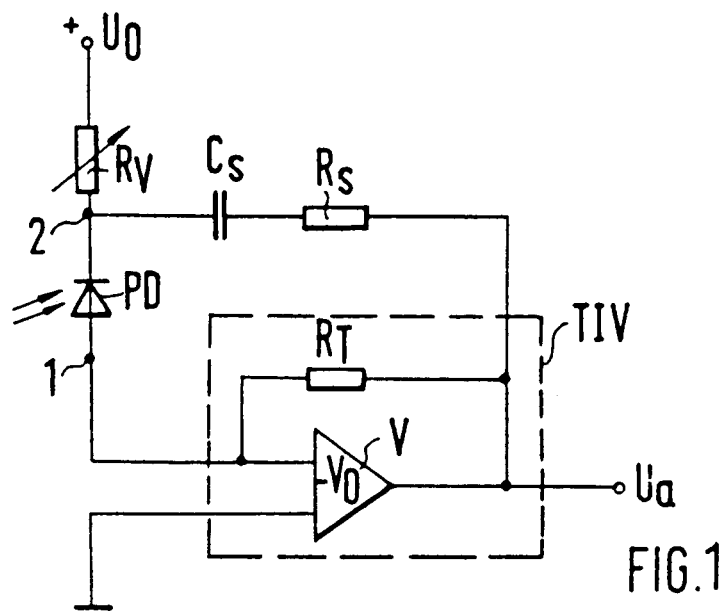
FIG. 1 is a basic circuit diagram of the optical receiver in accordance with the invention.

The optical receiver of FIG. 1, like the prior-art optical receiver, contains essentially a photodiode PD, a supply-voltage source $U_O$ for the photodiode PD, and a transimpedance amplifier TIV (bounded by a dashed line). The anode 1 of the photodiode PD is directly connected to the input of the transimpedance amplifier TIV.

The transimpedance amplifier can be constructed in any of the conventional forms, which are characterized by an amplifier circuit V with a gain of $-V_O$ which is shunted by a feedback resistor $R_T$. It converts the photocurrent of the photodiode PD into an output voltage $U_a$, which appears at the output designated by the same reference characters.

Another feature which the optical receiver of FIG. 1 has in common with the above-mentioned prior-art receiver is that the DC circuit of the photodiode includes a variable resistor $R_V$ between the cathode terminal 2 of the photodiode and the supply-voltage source $U_O$. This resistor, as is described in detail in the printed publication mentioned above, serves to limit the DC circuit of the photodiode at high levels of the light impinging on the photodiode and, thus, to change the DC operating point of the photodiode.

Figure 2:
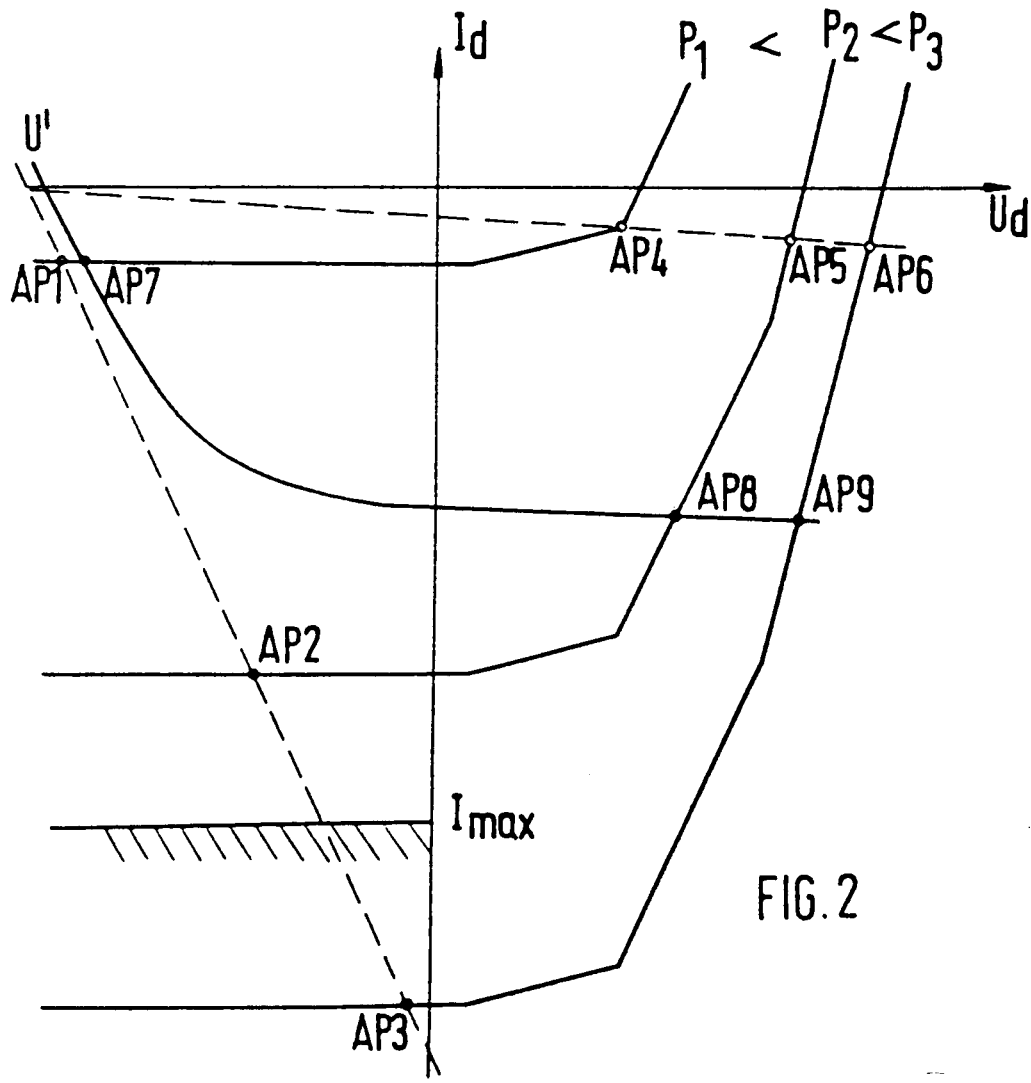
FIG. 2 shows the family of characteristics of a typical photodiode to explain the invention.

This explanation will now be briefly repeated with the aid of FIG. 2. The latter shows schematically the characteristics of the photodiode for three different levels of the received optical signal, $P_1 < P_2 < P_3$, with $I_d$ and $U_d$ representing, respectively, the current and the voltage of the photodiode. $I_d$ is linearly dependent on $U_d$, with the slope of the straight line depending on the value of the resistor in the DC circuit of the photodiode. The intersections of this straight line and the characteristics are the DC operating points of the photodiodes.

In FIG. 2 it can be seen that a gradually sloping straight line which intersects the photodiode characteristics in their steeply sloping portions, e.g., the straight line through the operating points AP4, AP5, and AP6, ensures even at high light levels that the maximum permissible current $I_{max}$ for the transimpedance amplifier is not exceeded, whereas in the case of an $I_d/U_d$ function passing through operating points AP1, AP2, and AP3, which is the case if the resistor in the DC circuit has a small value, a nonpermissible operating point AP3 would be obtained at the high light level P3.

As is known from the printed publication mentioned at the beginning, the changeover from the operating points AP1 through AP3 to the operating points AP4 through AP6 is effected by changing the resistance of the resistor from a low to a high value. At a high resistance, i.e., at the operating points AP4 through AP6, there is hardly any change in the current through the photodiode in case of light-level variations, but only the voltage $U_d$ changes, so that in this mode, the photodiode is an AC voltage source.

To convert this alternating voltage into an alternating current serving as the input current for the transpedance amplifier, the prior art uses an AC circuit which is partly included in the DC circuit of the photodiode, from which it is grounded. In this respect, the invention differs considerably from the prior art.

According to the invention, the AC circuit runs from the photodiode terminal not connected to the input of the transimpedance amplifier TIV, i.e., the terminal 2, to the output of the transimpedance amplifier. As shown in FIG. 1, it contains an impedance consisting of a resistor $R_S$ and a capacitor $C_S$ connected in series with this resistor and serving to isolate the DC path from the AC path. Under suitable current and voltage conditions, the capacitor $C_S$ can be dispensed with. Instead of the resistor $R_S$, an impedance consisting of a resistor and a parallel capacitor or a complex active or passive RLC four-terminal network may be present if equalization of the output voltage $U_a$ is desired.

In any case, the connection from the terminal 2 to the output of the transimpedance amplifier TIV completes an AC circuit from the ground terminal of the transimpedance amplifier TIV through the photodiode, the impedance $R_S$, $C_S$ and the output voltage $U_a$ back to In the following, the significance of the resistors $R_V$ and $R_S$ for the dynamic range of the novel circuit will be explained, assuming that the capacitor $C_S$ has a very high capacitance, i.e., that it is virtually a short circuit for alternating current.

With the aid of equivalent circuit diagrams, it can be shown that for the novel circuit, $$U_a \approx - \frac{R_d}{\alpha + \frac{R_d}{R_T} + \frac{1}{V_0}} I_d \quad (1)$$

where $$\alpha = \frac{R_V}{R_V + R_S} \quad (2)$$

and $I_d$ = strength of the current flowing through the photodiode
$R_d$ = differential internal resistance of the photodiode
$R_T$ = value of the feedback resistor $R_T$
$V_O$ = gain of the amplifier circuit V
$R_V$ = value of the resistor $R_V$
$R_S$ = value of the resistor $R_S$, and
$U_a$ = voltage (with respect to ground) at the output $U_a$ of the transimpedance amplifier.

The foregoing expression for $U_a$ is based on the assumption that $R_S$ is very small compared with $R_T$, so that $R_S/R_T$ is nearly zero. However, this is not a prerequisite for the functioning of the novel optical receiver but only serves to facilitate the explanation of the receiver.

The output voltage $U_a$ thus depends on the variables $R_V$ and $R_D$. At low light levels (e.g., P1, P2), the novel circuit, just as the prior art circuit, will be operated to advantage at the operating points AP1 and AP2. These operating points, as mentioned above, are predetermined by a very small value $R_V$. On the other hand, the differential resistance $R_d$ of the photodiode, which is given by $$R_d = \frac{dU_d}{dI_d},$$

is very high at these operating points, because the photodiode characteristics have very gradual slopes. Under these conditions ($R_V$ very small, $R_d$ very large), Eq. (1) becomes $$U \approx R_T \cdot I_d \qquad (3)$$

This means that the novel circuit will act approximately like the prior-art optical receiver if $R_V$ is made very small, as is done in all "normal" transimpedance receivers.

If, however, in order to avoid overloading the transimpedance receiver at high light levels, $R_V$ is chosen —again in accordance with the principle of the above-mentioned prior-art optical receiver —to be so large as to obtain operating points in the steeply rising portions of the diode characteristics, e.g., AP4 through AP6, conditions are as follows: The differential internal resistance $R_d$ is very low at these operating points, so that under these conditions ($R_V$ very large, and $R_d$ very small), Eq. (1) becomes $$U_a \approx R_d \cdot I_d \qquad (4)$$

since $\alpha \approx 1$ and $$\frac{R_d}{R_T} \ll 1$$

and, in most cases, $$\frac{1}{V_0} \ll 1.$$

In Eq. (4), $R_d$ is a function of $I_d$. From the equation of the characteristic of the photodiode, one can derive that $$R_d = \frac{1}{m} \cdot \frac{U_T}{I_d} \qquad (5)$$

Thus, the product $R_d \cdot I_d$ is constant, namely equal to $U_T/m$, where $U_T$ is the so-called temperature voltage of the photodiode, and m is a correction factor which allows for the deviation from Shockley's simple diode theory, cf. textbook by U. Tietze and Ch. Schenk, "Halbleiter-Schaltungstechnik", eighth, revised edition, Springer-Verlag, Berlin, Heidelberg, New York, London, Paris, Tokio, 1986, p. 24.

From the preceding description it follows that through such a change in the value of the resistor $R_V$ which places the operating points in the steeply rising portions of the characteristics, the output voltage of the transimpedance amplifier can be limited to a constant value, so that neither the transimpedance amplifier TIV nor the subsequent circuits will be overloaded. It can be shown that with the prior-art circuit, limitation of the output voltage to such a low value is not attainable without disadvantages resulting therefrom.

Now the question is how, in a practical circuit, the value of the resistor $R_V$ can be changed in such a manner that the above-described shifts of the operating points are achieved at high light levels.

This can be done in the same manner as in the prior-art circuit, namely by selectively connecting a suitable resistor from a major supply of resistors into circuit and by changing from one resistor to another if high light levels are to be expected. The necessary current limiting can also be accomplished with a continuously variable resistor $R_V$ and a control circuit which controls the resistance of this resistor in accordance with the light level as explained above.

The ideal solution, however, is an element which limits the direct current in the DC circuit of the photodiode by itself when the light level rises, thus causing the above-described shifts of the operating points automatically. According to an essential aspect of the invention, this is accomplished by replacing the resistor $R_V$ of FIG. 1 with a circuit whose current-voltage characteristic resembles the output characteristic of a bipolar transistor at a constant base current.

As is well known, the output characteristic of a bipolar transistor at a constant base current shows that the current first rises steeply to a given value with increasing voltage and then remains nearly constant. In this region of constant current, the transistor circuit is a nearly ideal current source. Such transistor circuits and their output characteristics are described in the relevant literature, e.g., in the above-cited textbook on pages 28 and 29.

Figure 3:
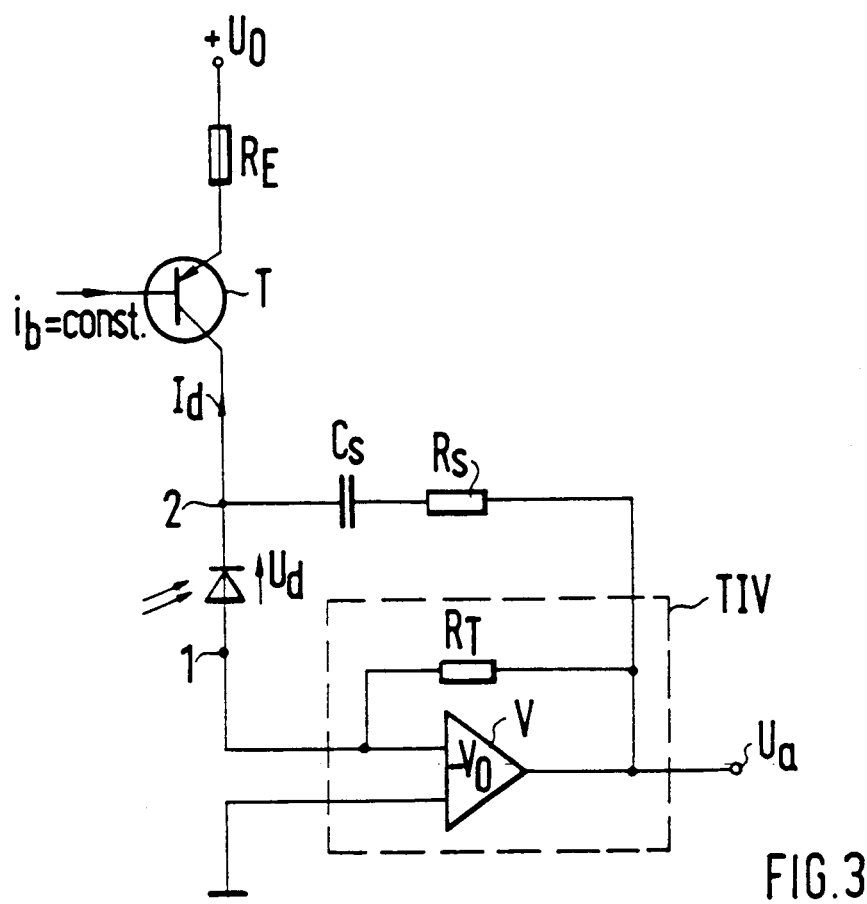
FIG. 3 is a basic circuit diagram of an embodiment of the invention incorporating a transistor circuit instead of the variable resistor $R_v$ of FIG. 1.

FIG. 3 shows the circuit according to the invention, which differs from the circuit of FIG. 1 in that the resistor $R_V$ has been replaced by a transistor circuit. The latter consists of a bipolar pnp transistor T whose emitter is connected via an emitter resistor $R_E$ to the supply-voltage source $U_O$, and whose collector is coupled to the terminal 2 of the photodiode. By means not shown, it is ensured that the base current $I_b$ is constant.

Simple considerations taking into account the current and Voltage direction show that, as a result of the action of this transistor circuit, the current $I_d$ first increases rapidly in the negative direction with increasing diode voltage $U_d$, similarly to the steep straight line through points AP1 to AP3, but soon slopes more gradually and becomes more and more monotonous. Such a curve is shown in FIG. 2 and gives the operating points AP7 to AP9.

The transistor circuit thus limits the current $I_d$ in such a way that operating points at which $I_{max}$ would be exceeded do not form. Without any control or switching operations, it is ensured that at high light levels the operating points lie in the steeply rising portions of the characteristics (AP8, AP9). In other words, the diode current $I_d$ does not increase with increasing light level as would be the case with the straight line through the operating points AP1 to AP3, but the current is limited to an acceptable value, and the voltage across the photodiode is inverted from the negative range to the positive range. Any circuit capable of doing this is suitable for implementing the invention. The transistor circuit of FIG. 3, which is only a basic circuit, is just an example.

For example, all variants of the constant-current sources given in the above-mentioned textbook on pages 59 to 63, including the current mirror, and the current sources shown on pages 356 to 364 are suitable, it being possible to reduce the resistance in the AC circuit at low light levels by an additional circuit element, e.g., in the circuit of FIG. 13.11 on p. 357 by a resistor in parallel with $R_1$.

Finally, it should be pointed out that the shift of operating points described with the aid of FIG. 2 can also be accomplished by changing another parameter, namely the bias $U_O$. The latter determines the point at which a straight line whose slope is determined by a resistor intersects the abscissa, independently of the slope of the straight line. This point of intersection is denoted by U' in FIG. 2. From FIG. 2 it is readily apparent that by a control which shifts the point U' of the straight line through AP1 to AP3 and, thus, this straight line itself to the right with increasing light levels, it is possible to avoid operating points such as AP3, at which $I_{max}$ is exceeded.

Thus, it is also possible to extend the dynamic range with a fixed resistor $R_V$ of a very low value by changing the bias, which is easier to implement than the control of a resistor. In the simplest case, analogously to the above-indicated change in the value of the resistor $R_V$, a suitable voltage from a supply of voltages serves as the bias voltage.

It is also possible, of course, to combine the change in the value of the resistor with the bias change, continuously or discontinuously, or to change the bias $U_O$ applied to the transistor circuit used in FIG. 3 as a current-limiting element.

In principle, the current-limiting element in the DC circuit of the photodiode, i.e., the resistor $R_V$ or the transistor circuit, could also be located on the other side of the photodiode PD.

In the arrangement of FIG. 1, an inductor can be placed between $R_V$ and the terminal 2 of the photodiode to reduce the effect of stray capacitances of $R_V$ on the overall circuit.

We claim:

1. Optical receiver comprising a photodiode and a transimpedance amplifier, with the photodiode contained in a direct-current circuit between a supply-voltage source and the input of the transimpedance amplifier, and further comprising an element limiting the direct current in the direct-current circuit and an alternating-current circuit fed from the photodiode, which acts as an AC voltage source, and containing an impedance which converts the alternating voltage of the photodiode into an alternating current flowing into the transimpedance amplifier, c h a r a c t e r i z e d  i n that the alternating current circuit couples the terminal (2) of the photodiode (PD) which is not connected to the input of the transimpedance amplifier (TIV) to the output ($U_a$) of the transimpedance amplifier.

2. An optical receiver as claimed in claim 1, characterized in that the impedance ($R_s$) is a resistor ($R_s$).

3. An optical receiver as claimed in claim 1, characterized in that the impedance is a series combination of a capacitor ($C_s$) and a resistor ($R_s$).

4. An optical receiver as claimed in claim 2 characterized in that the resistor ($R_s$) is shunted by a capacitor.

5. An optical receiver as claimed in claim 1 characterized in that the element limiting the direct current in the direct-current circuit is a nonlinear circuit (T, $R_E$) which is contained in the direct-current circuit and whose current-voltage characteristic resembles the output characteristic of a bipolar transistor at a constant base current.

6. An optical receiver as claimed in claim 1, characterized in that the element limiting the direct current in the direct-current circuit is a resistor in the direct-current circuit and a circuit for controlling the voltage of the bias source.

7. An optical receiver as claimed in claim 1 characterized in that the element limiting the direct current in the direct-current circuit is a switchable or controllable resistor in the direct-current circuit.

8. An optical receiver as claimed in claim 3, characterized in that the resistor ($R_s$) is shunted by a capacitor.

9. An optical receiver as claimed in claim 2, characterized in that the element limiting the direct current in the direct-current circuit is a nonlinear circuit (T, $R_E$) which is contained inn the direct-current circuit and whose current-voltage characteristic resembles the output characteristic of a bipolar transistor at a constant base current.

10. An optical receiver as claimed in claim 3, characterized in that the element limiting the direct current in the direct-current circuit is a nonlinear circuit (T, $R_E$) which is contained in the direct-current circuit and whose current-voltage characteristic resembles the output characteristic of a bipolar transistor at a constant base current.

11. An optical receiver as claimed in claim 4, characterized in that the element limiting the direct current in the direct-current circuit is a nonlinear circuit (T, $R_E$) which is contained in the direct-current circuit and whose current-voltage characteristic resembles the output characteristic of a bipolar transistor at a constant base current.

12. An optical receiver as claimed in claim 8, characterized in that the element limiting the direct current in the direct-current circuit is a nonlinear circuit (T, $R_E$) which is contained in the direct-current circuit and whose current-voltage characteristic resembles the output characteristic of a bipolar transistor at a constant base current.

13. An optical receiver as claimed in claim 2, characterized in that the element limiting the direct current in the direct-current circuit is a resistor in the direct-current circuit and a circuit for controlling the voltage of the bias source.

14. An optical receiver as claimed in claim 3, characterized in that the element limiting the direct current in the direct-current circuit is a resistor in the direct-current circuit and a circuit for controlling the voltage of the bias source.

15. An optical receiver as claimed in claim 4, characterized in that the element limiting the direct current in the direct-current circuit is a resistor inn the direct-current circuit and a circuit for controlling the voltage of the bias source.

16. An optical receiver as claimed in claim 8, characterized in that the element limiting the direct current in the direct-current circuit is a resistor in the direct-current circuit and a circuit for controlling the voltage of the bias source.

17. An optical receiver as claimed in claim 2, characterized in that the element limiting the direct current in the direct-current circuit is a switchable or controllable resistor in the direct--current circuit.

18. An optical receiver as claimed in claim 3, characterized in that the element limiting the direct current in the direct-current circuit is a switchable or controllable resistor in the direct-current circuit.

19. An optical receiver as claimed in claim 4, characterized in that the element limiting the direct current in the direct-current circuit is a switchable or controllable resistor in the direct-current circuit.

20. An optical receiver as claimed inn claim 8, characterized in that the element limiting the direct current in the direct-current circuit is a switchable or controllable resistor in the direct-current circuit.

* * * * *